Nov. 14, 1950   J. H. BENNETT   2,530,041
POWER MOWER
Filed Jan. 28, 1948   5 Sheets-Sheet 1
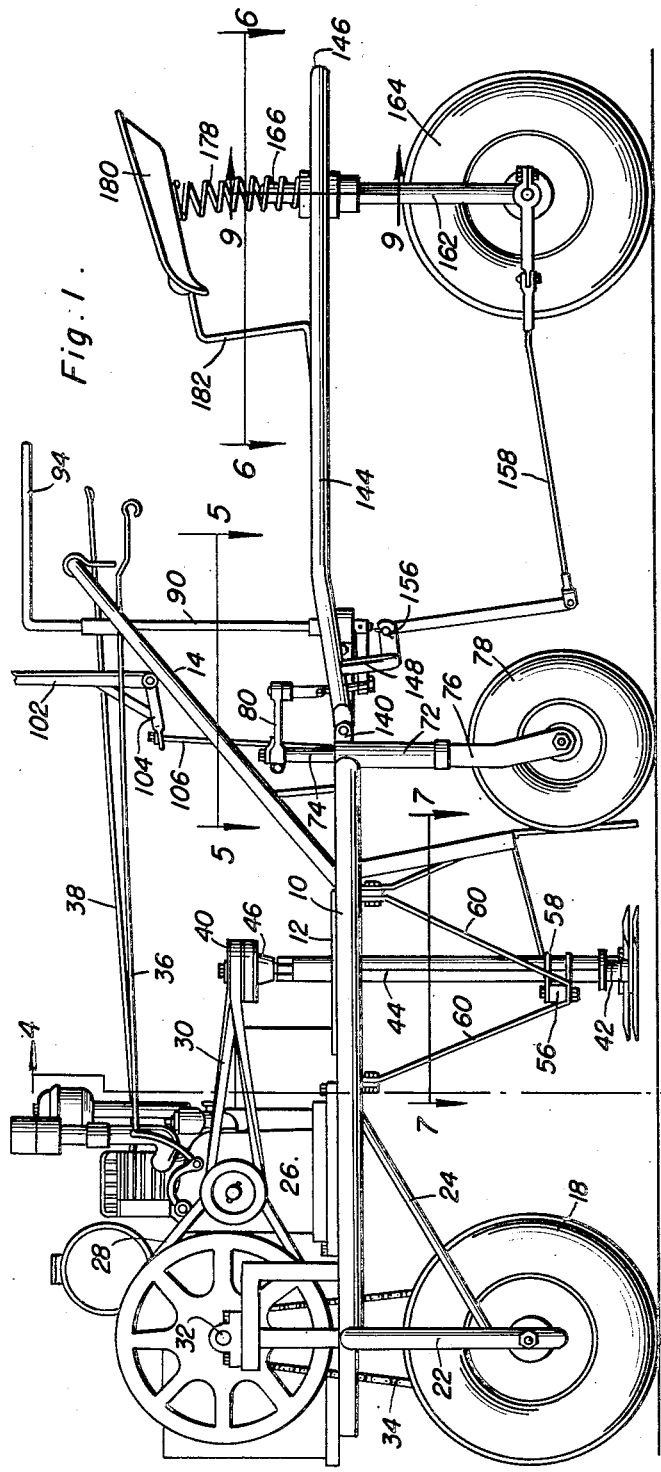
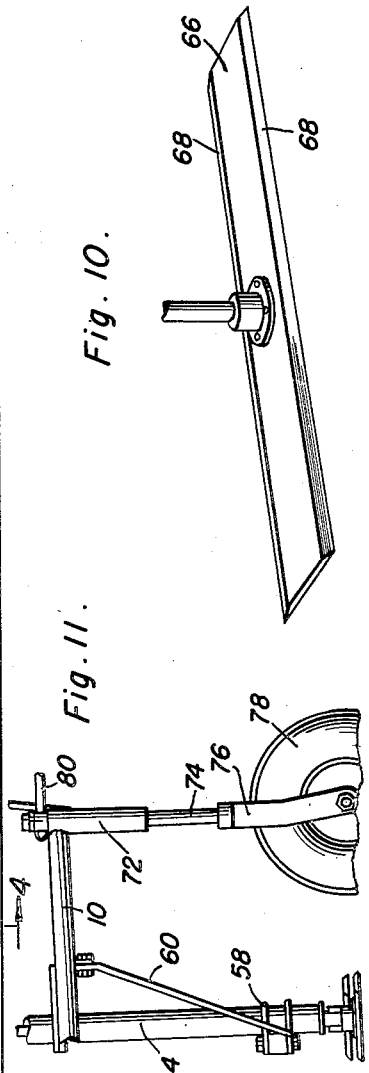
John H. Bennett
INVENTOR.

Nov. 14, 1950     J. H. BENNETT     2,530,041
POWER MOWER
Filed Jan. 28, 1948     5 Sheets-Sheet 2
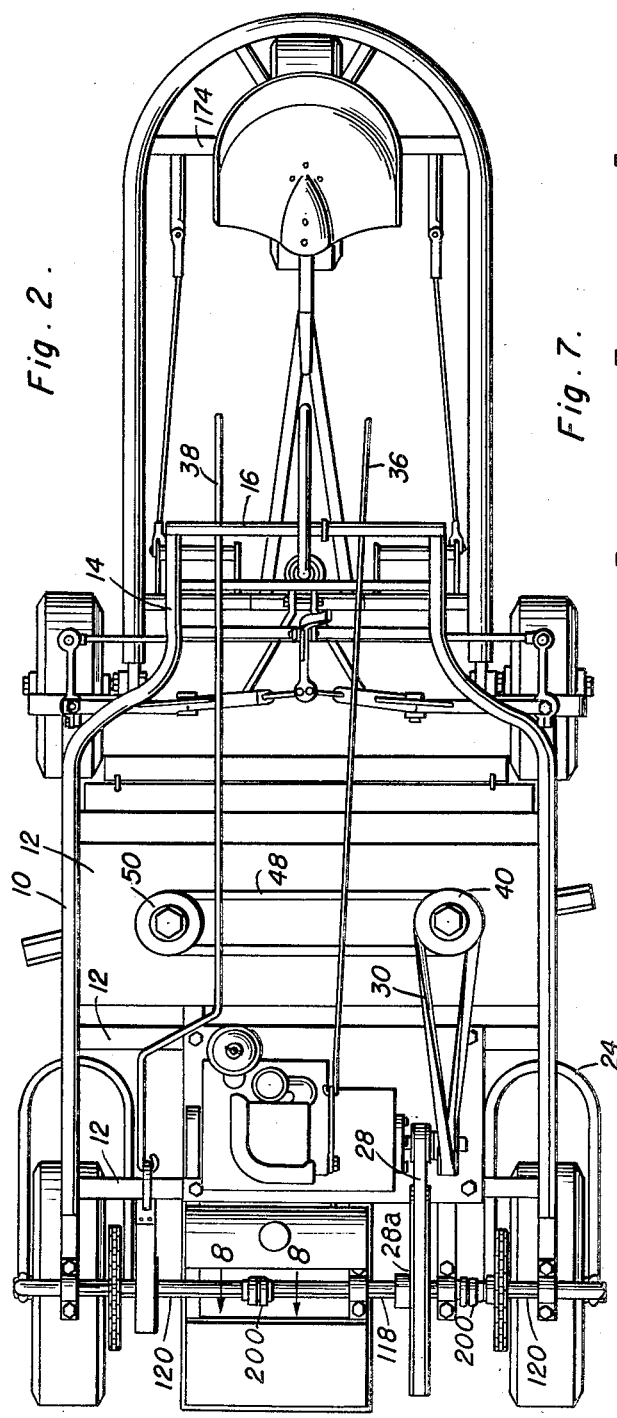
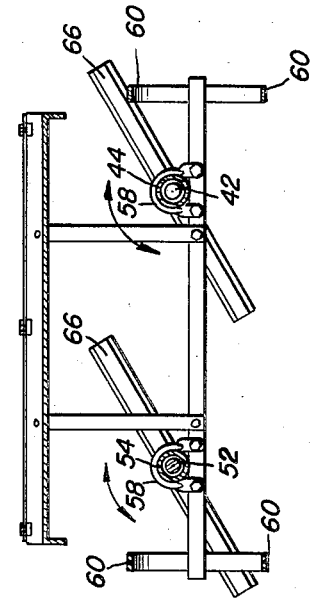
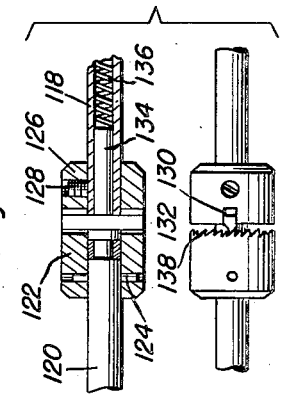
John H. Bennett
INVENTOR.

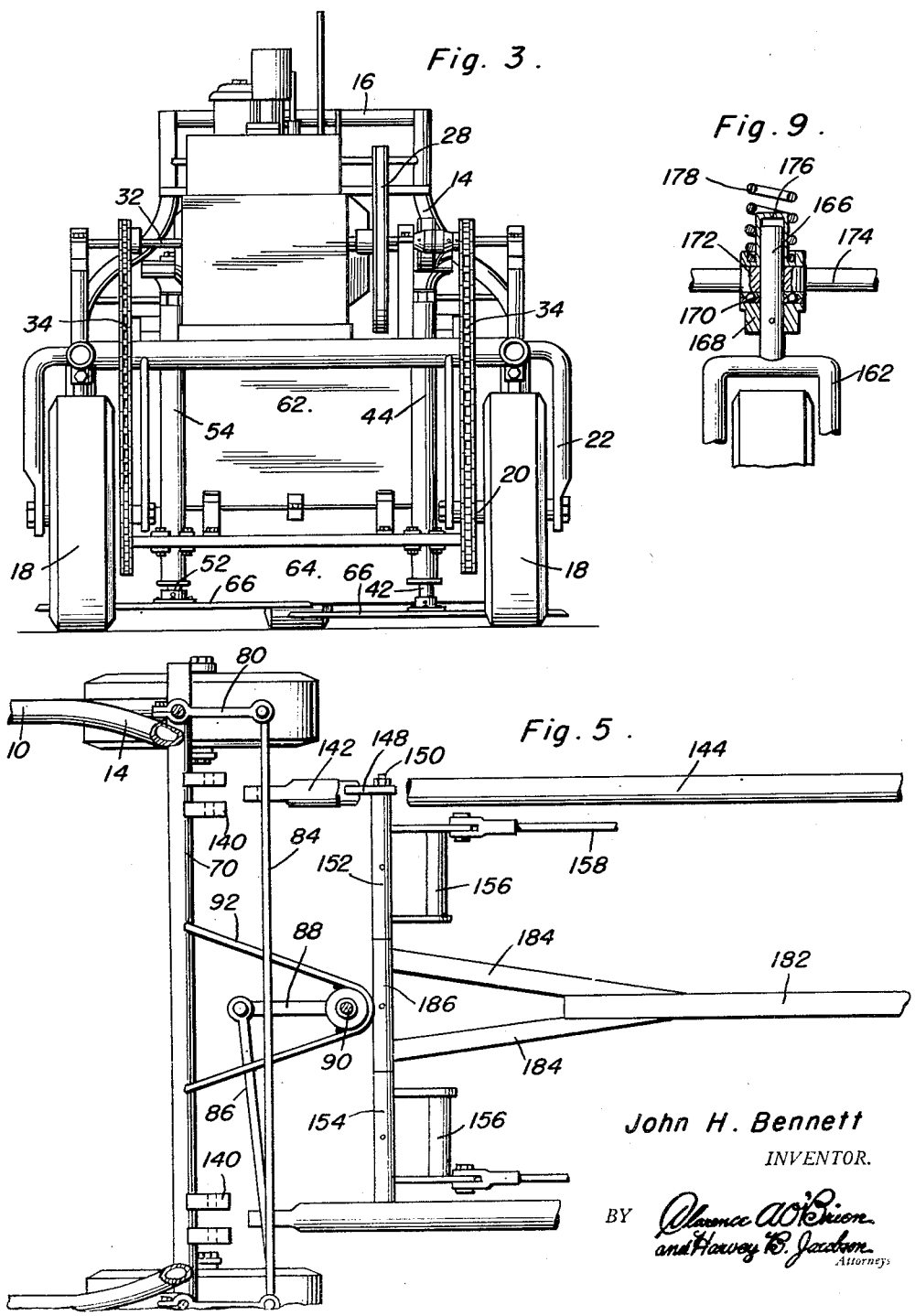

Nov. 14, 1950  J. H. BENNETT  2,530,041
POWER MOWER
Filed Jan. 28, 1948  5 Sheets-Sheet 4

John H. Bennett
INVENTOR.

John H. Bennett
INVENTOR.

Patented Nov. 14, 1950

2,530,041

UNITED STATES PATENT OFFICE 2,530,041

POWER MOWER

John H. Bennett, Falls County, Tex.

Application January 28, 1948, Serial No. 4,740

8 Claims. (Cl. 56—25.4)

This invention comprises novel and useful improvements in a power mower and more specifically pertains to a self-powered tractor mower which may be equipped with a trailer for conveying the driver of the mower.

The principal object of this invention is to provide a power mower which is capable of ready adjustment for cutting grass and growing vegetation at any desired height, and which is provided with an improved power transmission means, adjusting mechanism, steering mechanism and trailer means for use therewith.

An important feature of this invention resides in the provision of a power driven mower wherein the power is directly applied to each of the front wheels which are journalled on stub axles.

A further important feature of the invention resides in the provision of a differential driving mechanism between the source of power and the application of the power to the front wheels of the mower.

Yet another feature of the invention resides in the provision of a pair of parallel cutter shafts having horizontally rotating cutter plates thereon, together with improved means for supporting and journalling the cutter shafts, for driving the same from the power source.

Still another important feature of the invention resides in the provision of a novel mechanism for raising and lowering the rear supporting wheels of the mower to thereby vertically adjust the cutter blades with reference to the ground.

Yet another important feature of the invention resides in the provision of a novel steering mechanism for controlling the rear wheels of the power for guiding the same.

A further feature of the invention resides in the provision of a novel and improved trailer carriage together with an improved means for coupling the carriage to the mower for transportation therewith.

A still further important feature of the invention resides in the provision of an improved means which is foot operated for steering the rear wheels of the trailer carriage.

And a final important feature of the invention to be specifically enumerated herein, resides in the provision of a sturdy and substantial but withal simple frame construction of power mower and trailer carriage; together with an advantageous construction and arrangement of the controlling agencies for the power mower.

These, together with various ancillary objects and features of the invention which will later become apparent as the following description proceeds, are attained by this device, a preferred embodiment of which has been illustrated by way of example only in the accompanying drawings, wherein:

Figure 1 is a side elevational view showing the improved mower and the trailer carriage attached thereto;

Figure 2 is a top plan view of the construction of Figure 1;

Figure 3 is a front elevational view of the mower of Figure 1;

Figure 5 is a detailed view taken substantially in horizontal section upon the plane of the section line 5—5 of Figure 1 and illustrating the engaging portions of the power mower and of the wheeled carriage which may be employed therewith;

Figure 7 is a detailed view taken substantially upon the plane of the horizontal section line 7—7 of Figure 1 and showing the arrangement and mounting of the cutter blades;

Figure 8 is a composite view showing in longitudinal section and in elevation certain structural details of the differential drive gearing of the power mower;

Figure 9 is a fragmentary detailed view taken substantially upon the vertical plane of the section line 9—9 of Figure 1 and showing the journalling of the steering wheel of the carriage trailer and the spring mounting of the seat thereof;

Figure 10 is a perspective view of a portion of the cutter blade construction of the device;

Figure 11 is a fragmentary side elevational view showing a different position of adjustment of the rear wheels of the power mower of Figure 1;

Figure 4:
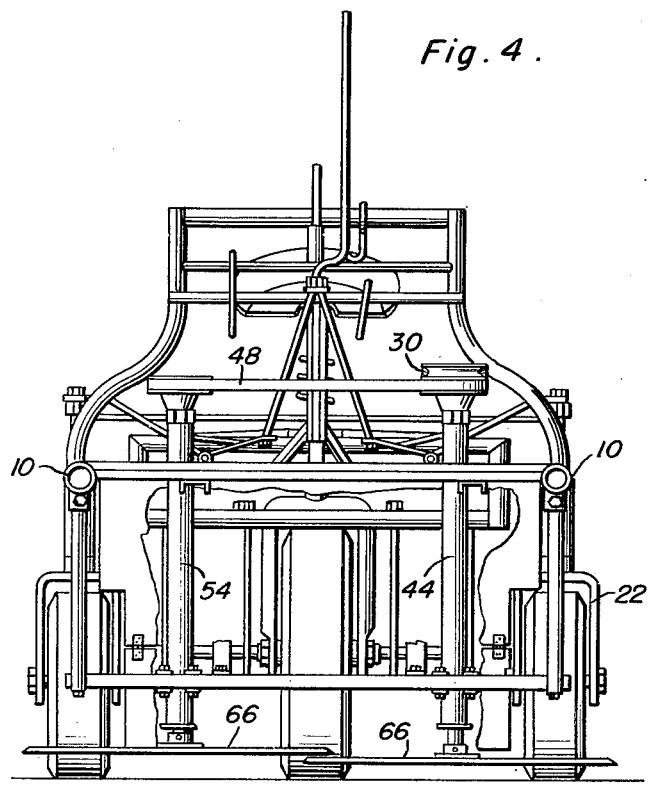
Figure 4 is a vertical transverse sectional view through the mower taken substantially on the plane of the section line 4—4 of Figure 1.

Referring now more particularly to Figures 1 and 2, the power mower shown therein includes a supporting frame which may be of any suitable construction but is preferably formed of generally tubular side members 10 to which are rigidly secured appropriate transversely extending side members 12 reinforcing the frame, imparting rigidity thereto and constituting the supporting base for mounting various parts of the apparatus thereon.

The rear end of the side frame members 10 are curved inwardly and parallel to each other as at 14 and are joined across their rear extremities by a transverse tubular cross-bar 16. A pair of front wheels 18 comprising the driving wheels of the power mower are mounted upon stub axles or spindles 20 journalled at the lower extremities of forks 22 which are rigidly secured to and depend from the frame members 10, these forks being rigidly braced as by rods 24 secured to the forks, and to the tubular frame members 10.

A source of power for the power mower, such as the combustion engine 26 of any suitable design is rigidly mounted upon the transverse supporting members 12, and as shown in Figure 2, is connected as by belts 28 and 30 respectively with the traction wheels of the power mower and with the four cutting blades as set forth hereinafter.

The belt 28 drives a lay shaft 32, extending transversely of and above the frame of the power mower and journalled thereon in any suitable manner. Driving chains 34 connect this lay or power shaft in a driving relation with each of the stub axles of the driving wheels 18, as shown best in Figure 3. Suitable differential mechanisms are provided in the lay shaft 32 as set forth hereinafter.

A pair of control rods 36 and 38 respectively control the application of power from the engine to the belts driven thereby, and the operation of a brake, not shown, of any conventional design which is preferably provided upon the lay shaft 32.

As shown more clearly in Figures 1 and 2, the driving belt 30 couples the engine to a pulley 40 secured to the upper end of a vertical cutter blade shaft 42 suitably journalled in a vertically disposed tubular housing 44 which is carried by one of the transverse members 12 and extend above and below the same into proximity with the ground. A second pulley 46 is likewise carried by the shaft 42 and is connected by a transverse pulley 48 with a driven pulley 50 secured to the upper end of a second vertically disposed rotary cutter blade shaft 52 disposed parallel to the shaft 42 and also journalled in a tubular housing 54 likewise supported by the transverse plate 12. The tubular housings 44 and 54 are preferably rigidly braced with respect to each other adjacent their lower ends by a transversely extending bar 56 secured to the housings as by U-shaped clamps 58, while further angularly disposed braces 60 rigidly secure the bar 56 to the frame members 10 of the power mower. Rearwardly of the cutter bars and depending from the frame of the power mower is a baffle plate or shield 62, see Figures 4, 11 and 12, which has a further detachable shield 64 detachably secured to the lower end thereof. This shield construction is to prevent grass or vegetation cut by the rotary blades or rocks or other matter hurled therefrom from passing rearwardly of the power mower to the possible detriment, damage and injury of the equipment or the operator thereof.

Rigidly but preferably detachably secured in any suitable manner to the lower ends of the vertical cutter blade shafts 42 and 52, are a pair of cutter blades 66 having both of their edges 68 sharpened to constitute cutter knives. As shown in Figure 7, the arrangement is such that the two blades have their paths of rotation intersecting, but the blades are so positioned as to pass each other, whereby a relatively wide swath may be mowed by the pair of blades.

As will be readily seen by reference to Figures 1 and 2, the rearwardly extending inwardly curved tubular members 14 extend upwardly from the frame members 10 and together with the cross-bars 60 constitute a handle means to assist the operator in walking behind and controlling the power mower, when the same is employed without the trailer carriage to be described hereinafter, and to constitute a hand support when the driver is seated in the trailer carriage. As will be seen best by reference to Figure 11, the rearmost ends of the frame members 10 have welded thereto a transverse frame member 70 and at the corners thereof have further welded thereto vertically disposed tubular housing members 72. Rotatably and slidably secured within the housings 72, are vertical shafts 74 provided with forks 76 at their lower ends which journal the rear supporting wheels 78 of the mower. Steering arms 80 are clamped as at 82 to the upper ends of the spindles 74, and are adjustably connected to each other as by a tie rod 84. A steering arm 86 is connected to the tie rod steering arm linkage and to a steering arm 88 secured to the lower end of a steering shaft 90 suitably journalled in a rearwardly extending frame 92 welded to the above mentioned rear transverse bar 70. The upper end of the steering rod 90 is provided with a lever arm or handle 94 by means of which the rear wheels of the mower may be turned in unison and steered in a manner which will now be readily understood.

As will be seen, this steering arm 94 is positioned for easy engagement by the operator walking behind the mower or alternatively, by an operator seated within the trailer carriage to be described hereinafter.

Figure 12:
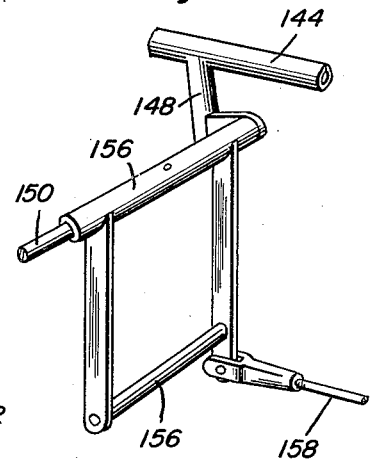
Figure 12 is a fragmentary perspective view of a portion of the steering means of the carriage showing certain structural features thereof.
Figure 6:
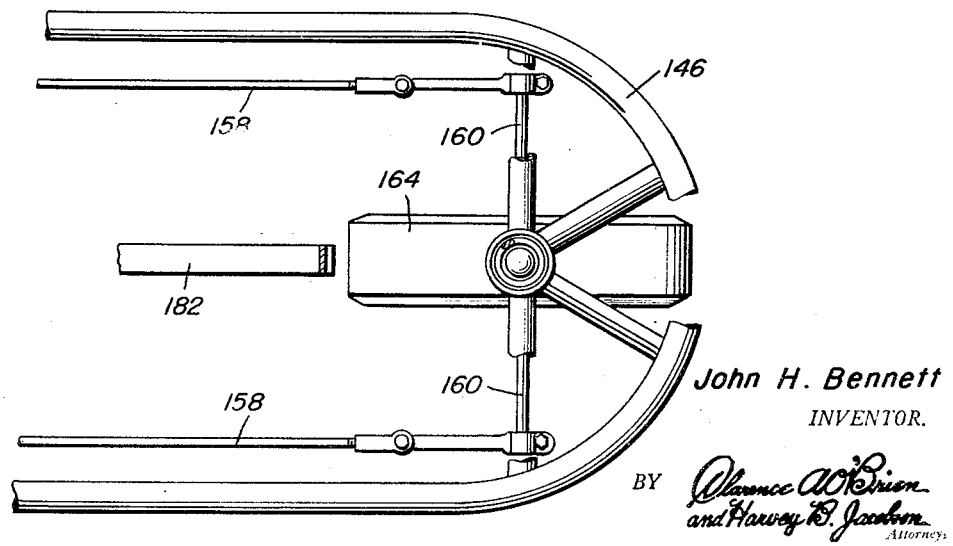
Figure 6 is a horizontal sectional view with parts broken away taken substantially upon the plane of the section line 6—6 of Figure 1, illustrating constructional details of the trailer carriage and its steering mechanism.
Figure 13:
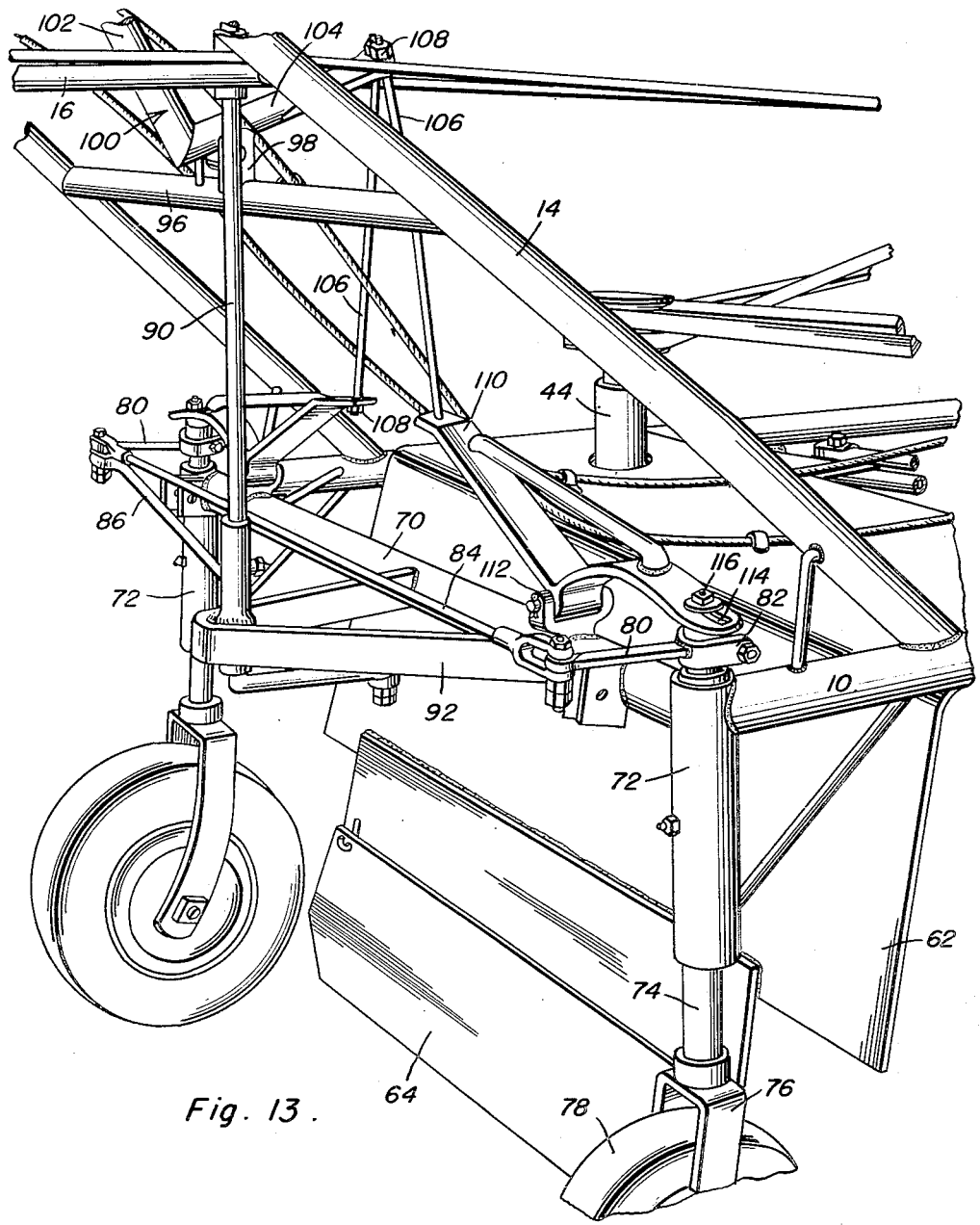
Figure 13 is a fragmentary perspective view of a portion of the rear end of the mower showing certain structural features thereof.

As will be further seen by reference to Figures 1, 2 and 12, means are provided for selectively raising or lowering the rear wheels relative to the frame of the mower to thereby vary the curve of the cutter blades from the ground and thus regulate the height at which grass or other vegetation is to be cut. For this purpose, a transverse bar 96 is secured between the two extremities 14, as by welding or the like and is provided with a bracket 98 which journals a bellcrank lever 100.

The upper end of this bellcrank, 102, constitutes an operating handle, while the other end 104 thereof is connected by a pair of links 106 adjustable as by fastening nuts 108, with the outer ends 110 of triangular bellcrank levers pivoted upon brackets 112 carried by the rear transverse bar 70, the other ends of these levers being connected as by elongated slots 114 with adjusting lock nuts 116 on the upper ends of the spindles 74. As will be thus evident, when the bellcrank lever 100 is oscillated or rocked, the triangular levers 110 will cause the raising or lowering of the spindles 74 in the housings 72, thereby adjustably elevating the cutter blades from the ground.

Attention is now directed more particularly to Figures 2 and 8 for a better understanding of the differential driving mechanism of the traction wheels of the mower. The shaft 32 includes a tubular central portion 118 to which is secured the pulley 28a driven by the belt 28, while rotatably coupled to the ends thereof are a pair of oppositely disposed solid lay shaft sections 120 upon which are mounted the sprockets driving the chain 34. The tubular shaft 118 is coupled to the driven shaft sections 120 by a ratchet or one-way clutch means 200 to be now described. Clutch jaw sections 122 are non-rotatably secured to the adjacent ends of the shaft sections 120 as by pins 124. This element 122 constitutes the driven member of the differential or one-way clutch assembly of the power transmission of the device. The driving member consists of a clutch member 126 secured as by a set screw 128 to the opposite extremities of the tubular shaft section 118. The outer ends of the members 126 are provided with diametrical slots 130 within which are slidably received clutch dogs 132 which are urged outwardly of the members 126 by means of a slidable pin 134 and a spring 136 housed within the tubular section 118. The adjacent surfaces of the clutch members 122 are provided with clutches 138 which are engageable by the dogs 132 whereby the driven sections 120 may be coupled to the driving section 118 in one direction of rotation of the driving shaft section 118. However, the arrangement is such that when one driving wheel tends to move faster than the other driving wheel as when making a turn, or a wheel slips, relative slipping is permitted between the clutch members to accommodate this differential effect.

Attention is now directed more particularly to Figures 1, 2, 5 and 6 for an understanding of the construction and manner of attaching and employing a carriage with the previously described power mower. As shown in Figures 5 and 12, the rear transverse bar 70 is provided with pairs of rearwardly extending lugs 140 between which are received and to which are connected as by a detachable pin, the sawed ends 142 of side frame member 144 whose rear end is bent upon itself as at 146 to form a one-piece tubular frame. Depending beneath the side frame member 144 at the front end thereof, are a pair of brackets 148 between which is journalled a transverse rod 150. Journalled on this rod 150 are a pair of sleeves 152 and 154 having foot pedals 156 which are connected to links 158 which at their rear extremities are connected to transversely disposed steering arms 160 secured to the lower end of a bifurcated fork 162 which journals the rear end steering wheel of the carriage 164. The fork 162 is provided with a vertically disposed upwardly extending spindle portion 166, to which spindle is secured a bearing race element 168. Anti-friction balls 170 are interposed between the bearing race 168 and a bearing element 172 which is freely rotatable upon the spindle 166 but which is rigidly attached to a transverse bar 174 connected to the frame member 144. Seated upon the upper end of the spindle 166 and resting upon the bearing member 172 is a cup shaped spring retainer 176 upon which is mounted a spring 178 resiliently supporting a seat 180 for receiving the operator of the power mower, which seat is connected as by means of a bar 182 having offset portions, this bar being pivoted as by rigidly attached legs 184, to a sleeve 186 journalled on the above mentioned transverse shaft 150. It will thus be seen that the sleeve is free to pivot about the transverse shaft 150, and its action is cushioned by the above mentioned spring 178. At the same time, the operator sitting in the seat can manipulate the foot pedals 156, whereby the rear wheel 164 may be steered to cause the carriage trailer to properly follow the power tractor which is steered by the handle 94.

From the foregoing, it is believed that the manner of constructing and operating the device will be readily understood and further explanation is believed to be unnecesary. Since numerous modifications and equivalents will readily occure to those skilled in the art, after a consideration of the foregoing specification and accompanying drawings, it is not intended to limit the invention to the exact construction shown and described but all suitable modifications and equivalents may be resorted to falling within the scope of the appended claims.

Having described the invention what is claimed as new is:

1. In a power mower, a frame, a pair of stub axles carried by said frame, a driving wheel mounted on each stub axle, a power shaft journalled transverse the front end of said frame and above the same, an engine mounted on said frame, said power shaft having a mid-section connected to said engine and aligned end sections individually connected to said stub axles and a one way clutch interposed between said mid-section and each end section, said end sections being disposed vertically above said stub axles.

2. In a power mower, a frame having forward driving wheels and rear steering wheels, an engine on said frame operatively connected to said driving wheels, a pair of parallel vertically disposed cutter shafts depending from and journalled on said frame between said driving and steering wheels, a cutter blade on each of said shafts, a driving connection between said engine and one of said shafts and a further driving connection between said shafts.

3. The combination of claim 2 wherein said further driving connection is disposed above said frame.

4. The combination of claim 2 including adjusting means comprising a lever journalled on said frame, a rod supporting each of said rear steering wheels and journalled on said frame for vertical sliding movement and linkage connecting said lever with each of said rods.

5. The combination of claim 4 wherein said linkage includes a member pivoted to said frame and connected to one of said rods, and a connecting rod adjustably connected to said member and to said lever.

6. In a power mower, a frame having forward driving wheels and rear steering wheels, an engine on said frame operatively connected to said driving wheels, a pair of parallel vertically disposed cutter shafts depending from and journalled on said frame between said driving and steering wheels, a cutter blade on each of said shafts, a driving connection between said engine and one of said shafts and a further driving connection between said shafts, means for steering said mower including vertical rods slidably journalled in said frame and each carrying a rear wheel, a steering arm on each of said rods, a tie rod adjustably connecting said steering arm, a link connected to said tie rod and a steering shaft connected to said link.

7. The combination of claim 2 including a trailer detachably connected to said mower, said trailer including a U-shaped tubular member forming a frame, the open ends of said member being pivoted to said mower frame, a single wheel supporting said trailer, said wheel being journalled at the rear end of said trailer and foot operated means for steering said wheel.

8. The combination of claim 7 including a vertically disposed spindle rotatably journalled in said frame, the lower end of said spindle terminating in a fork journalling said wheel, arms extending laterally from said spindle, steering rods connected to said arms, said steering rods being connected to said foot operated means.

JOHN H. BENNETT.

REFERENCES CITED

The following references are of record in the file of this patent:

UNITED STATES PATENTS

| Number | Name | Date |
|---|---|---|
| 360,876 | Hallett | Apr. 12, 1887 |
| 1,614,333 | Worthington | Jan. 11, 1927 |
| 1,672,250 | Felton | June 5, 1928 |
| 1,692,899 | Ketelsen | Nov. 27, 1928 |
| 2,017,524 | Bolens | Oct. 15, 1935 |
| 2,188,110 | Fahnestock | Jan. 23, 1940 |
| 2,245,821 | Poynter | June 17, 1941 |
| 2,299,859 | Speiser | Oct. 27, 1942 |
| 2,435,563 | Acton | Feb. 10, 1948 |